Patented Feb. 20, 1940

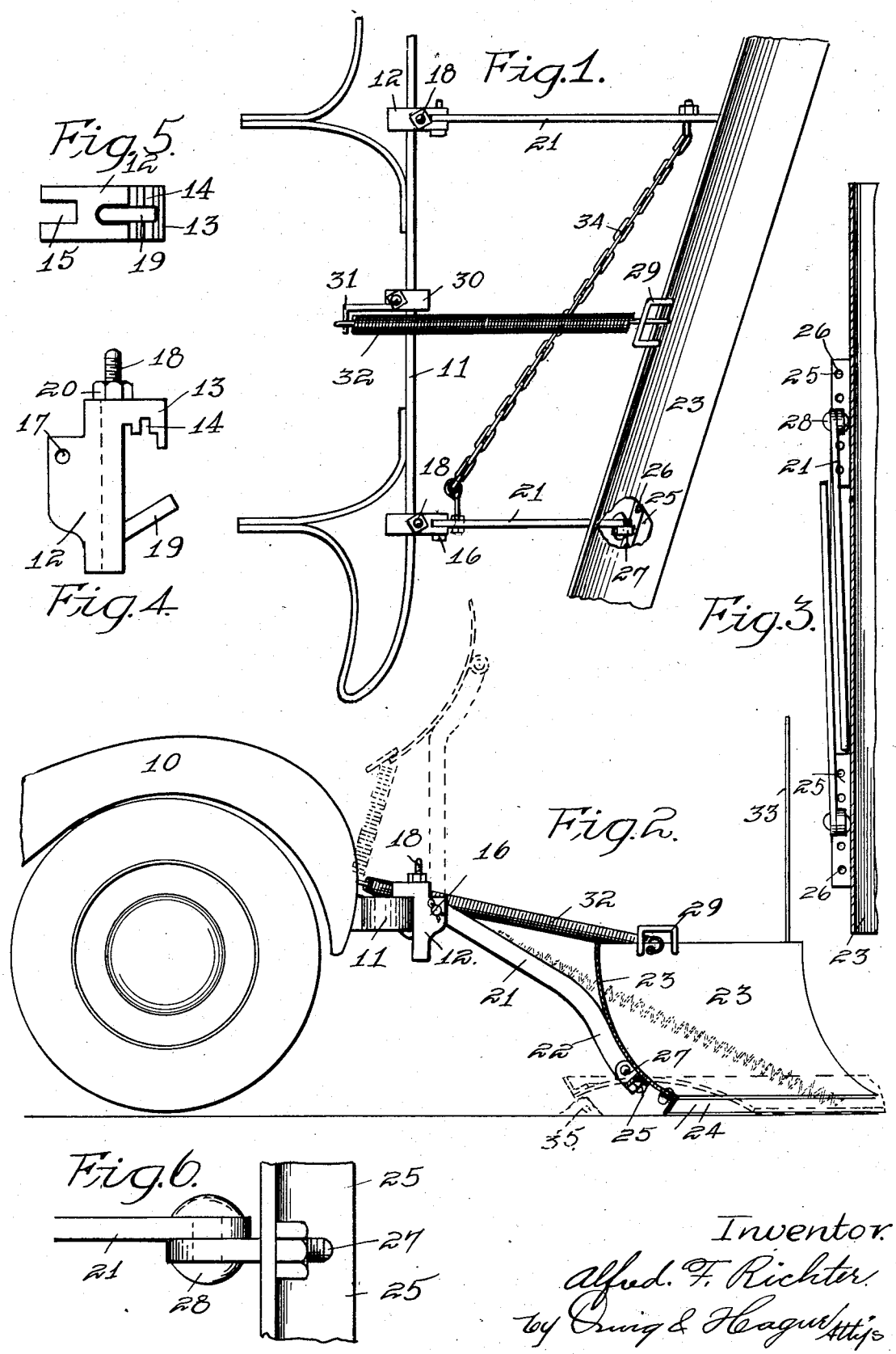

2,191,323

UNITED STATES PATENT OFFICE 2,191,323

SNOW PLOW ATTACHMENT FOR AUTOMOBILES

Alfred F. Richter, Des Moines, Iowa

Application October 25, 1937, Serial No. 170,875

3 Claims. (Cl. 37—42)

The objects of my invention are to provide a snow plow of simple, durable and inexpensive construction especially designed to utilize the inherent qualities of strength and resilience of the ordinary automobile bumper as its sole support.

A further object is to provide a snow plow of this class in which the strains and stresses necessarily applied to the plow blade will be transmitted to the bumper along lines which will not apply twisting strains to the bumper in such manner as to injure the bumper, and to apply such strains in a substantially horizontal direction rearwardly upon the bumper in the direction which automobile bumpers are especially designed to withstand.

A further object is to provide means for supporting the plow blade by an automobile bumper in such manner that the plow blade may rest upon and follow the contour of a roadway being scraped, independently of the position of the automobile or its bumper.

A further object is to provide a snow plow in which when the plow blade strikes an obstruction which it cannot remove, the blade will automatically fold with its top edge swinging forwardly to thereby ride over the obstruction and then automatically return to normal position, and further in this connection to provide means whereby the plow blade may be readily and easily swung upwardly to rest against the automobile and there yieldingly held for convenience in transportation.

A further object is to provide such connection between the plow blade and its supporting arms that when the arms are detached from an automobile bumper they may be folded against the rear of the plow blade.

A further object is to provide an improved bracket especially adapted for supporting a snow plow blade and capable of being readily, quickly and easily applied to automobile bumpers of all of the various shapes and sizes now in general use.

In the accompanying drawing

Figure 1 shows a top or plan view of my improved snow plow attached to an automobile bumper in position for normal use.

Figure 2 shows a side elevation of an automobile and bumper and my improved snow plow attached thereto, the plow blade being shown in vertical section. The dotted lines show the position of the plow blade when tilted forwardly and also the position of the plow blade when it is swung upwardly for transportation purposes.

Figure 3 shows a horizontal sectional view through the plow blade and illustrating the brackets to receive the plow blade supporting arms.

Figure 4 shows a side elevation of my improved bracket device for connecting the blade supporting arms with the bumper.

Figure 5 shows an inverted plan view of same; and

Figure 6 shows an enlarged detail view illustrating the means for connecting the forward ends of the blade supporting arms with the bracket at the rear of the blade.

Referring to the accompanying drawing I have used the reference numeral 10 to indicate that part of an automobile shown and 11 the automobile bumper.

The automobile bumpers now in general use have widely varying shapes. Some of them have flat front surfaces, some have their front surfaces curved forwardly, and they are of widely different vertical dimensions. For the purpose of applying my improved snow plow to bumpers of all of the various classes I have provided a bracket device comprising a body portion 12, having a rearward extension 13 at its upper end and formed on its under surface a series of notches 14. In the front of the bracket is a vertical slot 15 to receive the supporting arms to which they are pivotally connected by means of a pin 16 extended through the openings 17 in the bracket. Extended vertically through the bracket a bolt 18 is slidingly mounted, having at its lower end an upwardly and rearwardly extending arm 19, and applied to the upper end of the bolt on top of the bracket a nut 20. This bracket may be readily, quickly and easily applied to any of the ordinary types of bumpers by placing the extension 13 on top of the bumper and then drawing up the arm 19 to engage the under side of the bumper. It is desirable with my device that the bracket be supported firmly upon the bumper in a substantially upright position, and in order that this may be accomplished the operator must select the proper one of the notches 14 into which to receive the upper edge of the bumper so that the bracket may, when tightly clamped, assume a substantially upright position. A bumper with a flat front surface would, of course, rest flat against the rear face of the bracket and in the notch adjacent the flat edge of the bracket, whereas, bumpers having curved front surfaces may be placed in any of the notches 14 which are so positioned as to hold the brackets substantially upright.

The supporting arms are indicated by the numeral 21 and have their rear ends inserted in the slots 15 where they are pivotally held by pins 16. These supporting arms have their body portions extended forwardly at an angle slightly divergent downwardly from the horizontal, and at their forward ends they are curved at 22 to substantially conform to the contour of the rear of the snow plow blade, as clearly shown in Figure 2.

The snow plow blade is indicated generally by the reference numeral 23, and is preferably curved from its lower edge rearwardly and upwardly. At its lower edge I preferably apply an angle bar 24 arranged longitudinally of the blade and riveted to the rear lower surface of the blade so that the downwardly and rearwardly projecting member of this angle bar engages and scrapes upon a roadway surface, and since it is inclined rearwardly, it will tend to ride over minor obstructions in the roadway.

At the rear of the snow plow blade, on opposite sides thereof, are two angle bar brackets 25 each formed with a series of openings 26. For connecting the forward ends of the arms 21 with these brackets 25 I have provided a bolt 27 to be extended through the bracket 25, and this bolt is pivotally connected with the forward end of the arm 21 by a rivet 28, as shown in Figure 6. In this manner the snow plow blade is free to tilt relative to the arms 21 in a direction with its top edge moving forwardly. It is shown at its forwardly inclined position by dotted lines in Figure 2. Also, the pivotal connection of the bolt 27 with the bracket 25 is such that when the nut on the bolt is loosened, the arms 21 may be swung to position parallel with the rear of the snow plow blade, as shown in Figure 3, for convenience in shipping and handling. At the top central portion of the snow plow blade is a handle 29 for convenience in carrying the snow plow.

Attached to the central portion of the bumper is a bracket 30 having a rearwardly extended arm 31. Attached to this arm is a coil spring 32, the forward end of which is attached to the top edge of the snow plow blade. An upright indicator device 33 is attached to the upper right end of the snow plow blade.

For the purpose of preventing lateral movement of the snow plow blade relative to the bumper when excessive strains and pressures are applied thereto, I have provided a chain 34 connected at one end to the long supporting arm 21 near the snow plow blade, and extended transversely of the bumper and connected at its rear end to the other one of the supporting arms near the bumper.

In practical operation, and assuming that my improved snow plow is attached to an automobile bumper in the manner shown and described, the driver of the automobile may readily and easily direct the snow plow over a roadway to be cleaned. At all times the lower edge of the blade will rest upon the roadway, even though the roadway inclines laterally at one side or the other and even though there are rather deep water-drain surfaces, and this is entirely independent of the relative position of the automobile or bumper there being sufficient looseness in the joints at the ends of the arms 21 to permit the slight tilting movement necessary to permit the blade to follow the slight changes in the lateral inclination of a roadway between the part thereof engaged by the blade and the part on which the front wheels of the automobile are resting. The low blade readily and easily rides over minor obstructions in the roadway because of the rearwardly inclined angle bar 24. However, in the event that the lower edge of the blade should strike an immovable obstruction, then the blade will tilt at its upper end, moving forwardly and then downwardly to rest upon the roadway surface until it passes over the obstruction. In Figure 2 such an obstruction is shown by dotted lines at 35, and the plow blade is shown as traveling over this obstruction. As soon as the obstruction is passed over, the spring 32 will automatically return the plow blade to its normal working position.

In the event that it is desired to transport the snow plow without removing it from the automobile, the operator simply grasps the handle 29 and swings the plow blade upwardly to the position shown by dotted lines in Figure 2, and when in this position the spring 32 will yieldingly hold it. When it is desired to remove and store the snow plow the operator simply disconnects the brackets 12 and 30 from the bumper, folds the arms 21 alongside the rear face of the blade and then folds the spring 32 and the chain 34 against the rear surface of the blade, whereupon the entire device may be readily and easily carried in one hand by an operator grasping the handle 29.

I claim as my invention:

1. A snow plow attachment for automobile bumpers, comprising two arms, means for pivotally connecting them to an automobile bumper in such manner that they extend forwardly and downwardly and are independently movable up and down at their forward ends, a snow plow blade, and means for pivotally connecting the forward ends of said arms to the snow plow blade in such manner that the upper edge of the snow plow blade may swing forwardly and downwardly whereby the snow plow blade may rest upon and follow the contour of a roadway independently of the position of the automobile bumper and either end of the snow plow blade may move upwardly and downwardly relative to its other end to follow lateral inclinations of a roadway over which the snow plow is being advanced.

2. A snow plow attachment for automobile bumpers, comprising two arms, means for pivotally connecting them to an automobile bumper in such manner that they extend forwardly and downwardly and are independently movable up and down at their forward ends, a snow plow blade, and means for pivotally connecting the forward ends of said arms to the snow plow blade in such manner that the upper edge of the snow plow blade may swing forwardly and downwardly whereby the snow plow blade may rest upon and follow the contour of a roadway independently of the position of the automobile bumper and either end of the snow plow blade may move upwardly and downwardly relative to its other end to follow lateral inclinations of a roadway over which the snow plow is being advanced, one of said arms being relatively long and the other relatively short, and a flexible bracing member attached at one end adjacent the rear end of the short arm and at its other end adjacent the forward end of the long arm to prevent lateral outward movement of the long arm.

3. A snow plow attachment for automobile bumpers, comprising two arms, means for pivotally connecting them to an automobile bumper in such manner that they extend forwardly and downwardly and are independently movable up and down at their forward ends, a snow plow blade, means for pivotally connecting the forward ends of said arms to the snow plow blade in such manner that the upper edge of the snow plow blade may swing forwardly and downwardly whereby the snow plow blade may rest upon and follow the contour of a roadway independently of the position of the automobile bumper and either end of the snow plow blade may move upwardly and downwardly relative to its other end to follow lateral inclinations of a roadway over which the snow plow is being advanced, means for limiting the upward and rearward movement of said arms when they reach a substantially upright position, a contractile coil spring attached at its forward end to the upper portion of the snow plow blade and extended upwardly and rearwardly, and means for attaching its rear end to an automobile bumper at a point in the rear of the bumper, said parts being so shaped and proportioned that when the blade is tilted forwardly and downwardly and then released the spring will return it to normal position, and when the blade is moved to its elevated position above the bumper, the spring will yieldingly hold it in its elevated position.

ALFRED F. RICHTER.